United States Patent
Lee et al.

(10) Patent No.: US 12,014,215 B2
(45) Date of Patent: Jun. 18, 2024

(54) ACTIVE SCHEDULING METHOD AND COMPUTING APPARATUS

(71) Applicant: SAMSUNG ELECTRONICS CO., LTD., Suwon-si (KR)

(72) Inventors: Jieun Lee, Suwon-si (KR); Jin-Hong Kim, Hwaseong-si (KR); Jaehyung Ahn, Suwon-si (KR); Sungduk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 17/327,600

(22) Filed: May 21, 2021

(65) Prior Publication Data
US 2022/0171658 A1    Jun. 2, 2022

(30) Foreign Application Priority Data
Dec. 2, 2020    (KR) .................. 10-2020-0166468

(51) Int. Cl.
  *G06F 9/50*    (2006.01)
  *G06F 9/38*    (2018.01)
  *G06F 9/54*    (2006.01)

(52) U.S. Cl.
  CPC .......... *G06F 9/5038* (2013.01); *G06F 9/3877* (2013.01); *G06F 9/505* (2013.01); *G06F 9/542* (2013.01)

(58) Field of Classification Search
  CPC .................................................... G06F 9/5038
  See application file for complete search history.

(56) References Cited

U.S. PATENT DOCUMENTS

| | | | |
|---|---|---|---|
| 5,361,362 A | 11/1994 | Benkeser et al. | |
| 8,612,981 B2 | 12/2013 | Murata | |
| 11,048,553 B1* | 6/2021 | Schadow | G06F 9/5072 |
| 2014/0282594 A1* | 9/2014 | Roy | G06F 9/5066 |
| | | | 718/105 |
| 2020/0117505 A1* | 4/2020 | Chen | G06F 9/542 |

FOREIGN PATENT DOCUMENTS

| | | |
|---|---|---|
| JP | 9-218859 A | 8/1997 |
| JP | 2005-339178 A | 12/2005 |
| JP | 2009-70264 A | 4/2009 |
| KR | 2003-0050860 A | 6/2003 |
| KR | 10-2052964 B1 | 12/2019 |
| WO | WO2011/148920 A1 | 12/2011 |

* cited by examiner

*Primary Examiner* — Charlie Sun
(74) *Attorney, Agent, or Firm* — NSIP Law

(57) ABSTRACT

An active scheduling method performed with a master processor and a plurality of slave processors. The method includes determining whether a job to be performed has a dependency by referencing a job queue; in a case in which it is determined that the job to be performed has a dependency, updating a state of the job to be performed in a table in which information of each of a plurality of jobs is recorded; analyzing a state of a job preceding the job to be performed based on the table; and in a case in which the job preceding the job to be performed is determined to have been completed, performing the job to be performed by retrieving the job to be performed from the job queue.

22 Claims, 7 Drawing Sheets

| Job ID | Slave ID | Preceding Job ID | State |
|---|---|---|---|
| 1 | 1 | – | Running |
| 2 | 2 | 1 | Standby |
| ⋮ | ⋮ | ⋮ | ⋮ |
| N | | | Initial |

ACTIVE SCHEDULING METHOD AND COMPUTING APPARATUS

CROSS-REFERENCE TO RELATED APPLICATIONS

This application claims the benefit under 35 USC § 119(a) of Korean Patent Application No. 10-2020-0166468, filed on Dec. 2, 2020, in the Korean Intellectual Property Office, the entire disclosure of which is incorporated herein by reference for all purposes.

BACKGROUND

1. Field

The following description relates to an active scheduling method and a computing apparatus to perform an active scheduling method.

2. Description of Related Art

To process a wide range of workloads with parallelism in an existing system with a master processor and/or slave processors, a scheduler of the master processor may allocate a job of a workload to each of the slave processors. The number of slave processors may be limited, and the remaining jobs that are not allocated may be allocated according to a scheduling policy of the master processor.

Due to use of a cache miss or a pointer, an execution time of a job a workload is not fixed. Accordingly, based on a scheduling method of the master processor, a portion of the slave processors may be idle. Also, since scheduling is determined by a master processor, performance may decrease due to a parallel overhead caused by, for example, identification of a job, designation of a slave processor that is to perform a job, or collection of result data of each job.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an active scheduling method performed with a master processor and a plurality of slave processors includes determining whether a job to be performed has a dependency by referencing a job queue; in a case in which it is determined that the job to be performed has a dependency, updating a state of the job to be performed in a table in which information of each of a plurality of jobs is recorded; analyzing a state of a job preceding the job to be performed based on the table; and in a case in which the job preceding the job to be performed is determined to have been completed, performing the job to be performed by retrieving the job to be performed from the job queue.

The job queue may be included in the master processor, and at least one slave processor, from among the plurality of slave processors, may be configured to perform the determining, updating, analyzing, and performing.

In a case in which the job preceding the job to be performed is determined to be running, the at least one processor may wait until the job preceding the job to be performed is completed; and in response to receiving a signal indicating the job preceding the job to be performed has been completed, perform the job to be performed.

The active scheduling method may include waking up the at least one slave processor in response to the signal being received by the at least one slave processor, and the at least one slave processor may be sleeping during the waiting.

The table may be stored in a controller, and the controller may be configured to transmit the signal indicating the job preceding the job to be performed has been completed.

The controller may be configured to determine that the job to be performed is mapped to the at least one slave processor based on the table and to transmit the signal to the at least one slave processor, in response to the state of the job preceding the job to be performed being changed to indicate the job preceding the job to be performed has been completed.

Updating the state of the job to be performed may include mapping an identifier (ID) of one of the slave processors to an ID of the job to be performed recorded in the table, and changing the state of the job to be performed to a standby state.

The active scheduling method may include, in a case in which it is determined that the job to be performed does not have a dependency, performing the job to be performed by retrieving the job to be performed from the job queue.

The job queue may include a bit indicating whether the job has the dependency.

Determining whether the job to be performed has the dependency may include determining that the job to be performed has the dependency in response to the bit being true, and determining that the job to be performed does not have the dependency in response to the bit being false.

The active scheduling method may include transmitting result data generated by completely performing the job to be performed to the master processor.

A plurality of jobs, which include the job to be performed, may be enqueued in the job queue by the master processor.

A workload corresponding to the jobs may include a workload with coarse-grained parallelism.

In another general aspect, a computing apparatus includes a master processor including a job queue and configured to enqueue a plurality of jobs of a workload in the job queue, and slave processors. A first slave processor among the slave processors is configured to determine whether a job to be performed from the job queue has a dependency, in a case in which it is determined that the job to be performed has a dependency, update a state of the job to be performed in a table in which information of each of the plurality of jobs is recorded, analyze a state of a job preceding the job to be performed based on the table, and in a case in which the job preceding the job to be performed is determined to have been completed, perform the job to be performed by retrieving the job to be performed from the job queue.

The first slave processor may be configured to wait, in a case in which the job preceding the job to be performed is determined to be running, and, in response to receiving a signal indicating the job preceding the job to be performed has been completed, to perform the job to be performed.

The first slave processor may be configured to sleep during the waiting and to wake up in response to receiving the signal.

The computing apparatus may include a controller, and the controller may be configured to store the table and to transmit the signal indicating the job preceding the job to be performed has been completed to the first slave processor.

The controller may be configured to determine that the job to be performed is mapped to the first slave processor based on the table and to transmit the signal to the first slave processor, in response to the state of the job preceding the job to be performed being changed to indicate the job preceding the job to be performed has been completed in the table.

The first slave processor may be configured to map an ID of the first slave processor to an ID of the job to be performed recorded in the table, and to change the state of the job to be performed to a standby state.

The job queue may include a bit indicating whether the job to be performed has the dependency.

The first slave processor may be configured to determine that the job to be performed has the dependency in response to the bit being true, and to determine that the job to be performed does not have the dependency in response to the bit being false.

The workload may include a workload with coarse-grained parallelism.

The master processor may be configured to determine an order of the slave processors in response to the slave processors simultaneously accessing the job queue.

In another general aspect, a computing apparatus includes a master processor including a first queue and a second queue and configured to analyze a dependency of each of a plurality of jobs of a workload, to classify the jobs as first jobs for which a preceding job is present and second jobs for which a preceding job is absent, to enqueue the first jobs in the first queue, and to enqueue the second jobs in the second queue, and includes a plurality of slave processors. Each of the slave processors may be configured to retrieve one of the second jobs from the second queue by accessing the second queue and to perform the retrieved second job.

The master processor may be configured to move one first job among the first jobs to the second queue in response to a job preceding the one first job being completely performed.

Other features and aspects will be apparent from the following detailed description, the drawings, and the claims.

Figure 1:
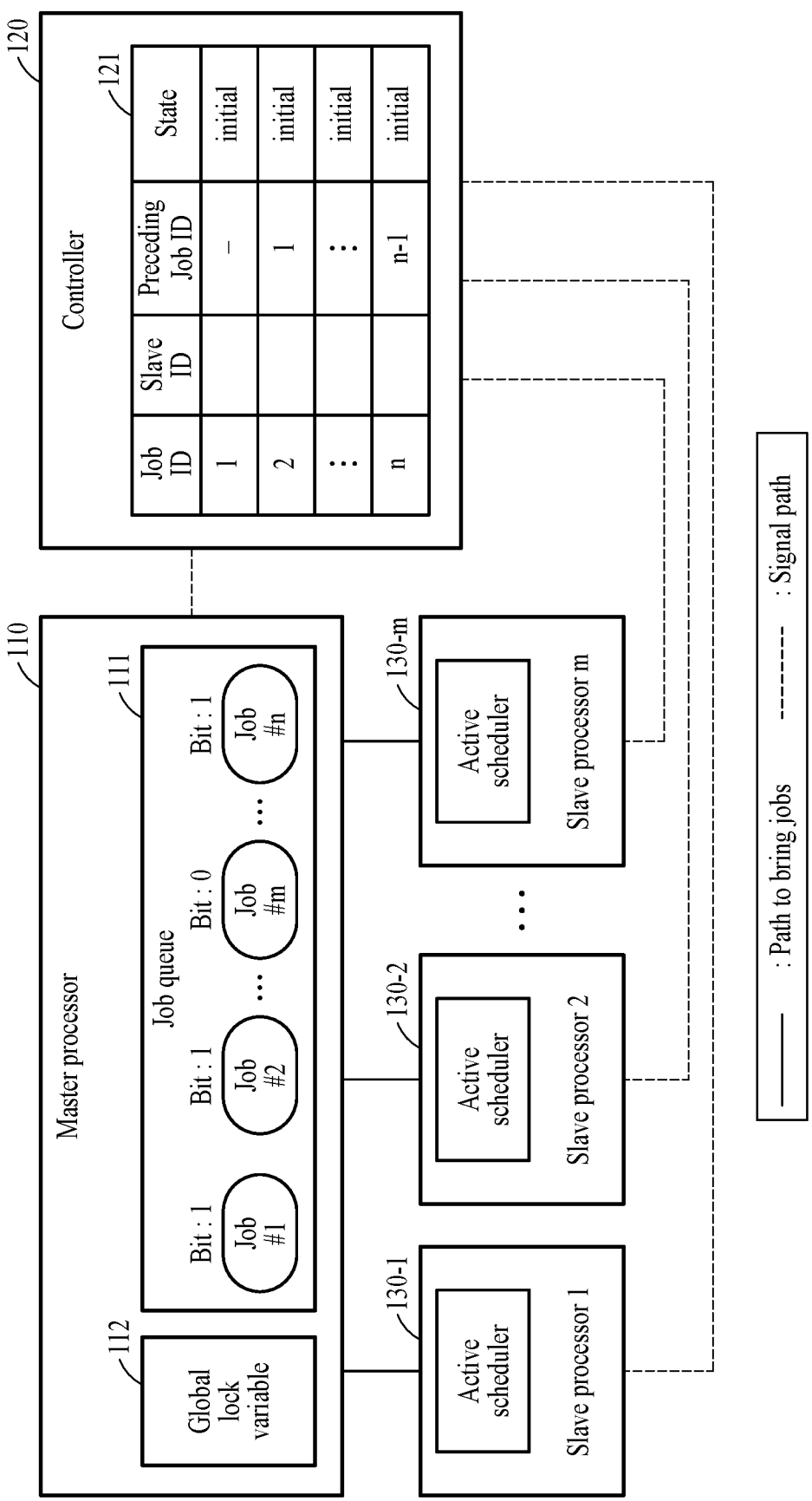
FIG. 1 illustrates an example of active scheduling in a system of multiple processors.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIGS. 1 to 5 illustrate examples of active scheduling in a system of multiple processors.

FIG. 1 illustrates a master processor 110, a controller 120, and a plurality of slave processors 130-1 to 130-m.

The master processor 110 may receive a workload from a host. The workload may include a workload with coarse-grained parallelism, however, there is no limitation thereto. The workload may include, for example, a workload with embarrassing parallelism in which there is little dependency, as well as iterations of floating-point operations and a large amount of numerical value calculation, such as vector or matrix calculation.

In a workload with parallelism, a dependency between jobs may exist. The master processor 110 may analyze a dependency between jobs of a workload. In FIG. 1, the master processor 110 may determine that job #2 uses result data of job #1. In other words, the master processor 110 may recognize that the job #1 is a preceding job of the job #2. The master processor 110 may determine that there is a dependency between the jobs #1 and #2. The master processor 110 may determine that job #m does not have a dependency. The master processor 110 may know that job #n uses result data of job #n−1, and accordingly it may be determined that there is a dependency between the jobs #n−1 and #n. For convenience of description, the jobs #1, #2, #m, and #n are illustrated in FIG. 1, and the master processor 110 may analyze which job has a dependency with each of jobs other than the jobs #1, #2, #m, #n−1 and #n that are described above, or whether each of the other jobs has a dependency.

The master processor 110 may enqueue jobs of a workload in a job queue 111.

The job queue 111 may include a dependency bit indicating whether each job of a workload has a dependency. The master processor 110 may determine whether each job of a workload has a dependency, and thus the master processor 110 may update a dependency bit of each job. As shown in FIG. 1, each of the jobs #1, #2, and #n has a dependency, and accordingly the master processor 110 may set a dependency bit of each of the jobs #1, #2, and #n to "1" or "true". Although not shown in FIG. 1, the master processor 110 may set a dependency bit of the job #n−1 to "1" or "true". The master processor 110 may set a dependency bit of the job #m to "0" or "false".

The master processor 110 may initialize a table 121 included in the controller 120.

The table 121 may include an identifier (ID) of a job with a dependency, an ID of a preceding job that needs to be performed before a job with a dependency can be performed, an ID of a slave processor that designates a job with a dependency, and a state of a job.

Referring to FIG. 1, the master processor 110 may determine that a preceding job of the job #1 is absent because the job #1 is a first job even though the job #1 has a dependency. The master processor 110 may record an ID "1" of the job #1 in the table 121. Since the table 121 is initialized by the master processor 110 as described above, a state of the job #1 may correspond to a state of "initial". The master processor 110 may determine that the job #2 has a dependency and that the job #1 is a preceding job of the job #2. The master processor 110 may record an ID "2" of the job #2 in the table 121, and may record the ID "1" of the job #1 as an ID of the preceding job of the job #2. A state of the job #2 may correspond to a state of "initial". Similarly, the master processor 110 may determine that the job #n has a dependency and that the job #n−1 is a preceding job of the job #n. The master processor 110 may record an ID "n" of the job #n in the table 121, and may record an ID "n−1" of the job #n−1 as an ID of the preceding job of the job #n. A state of the job #n may correspond to a state of "initial".

Each of the slave processors 130-1 to 130-*m* may include an active scheduler.

The master processor 110 may not allocate a job to each of the slave processors 130-1 to 130-*m*, and an active scheduler of each of the slave processors 130-1 to 130-*m* may bring a job from the job queue 111 of the master processor 110. Accordingly, a number of idle slave processors is minimized until a workload ends, and thus an overall latency may be reduced. Hereinafter, an overall operation of an active scheduler, and an individual operation of an active scheduler of each of the slave processors 130-1, 130-2, and 130-*m* will be described.

The master processor 110 may include a global lock variable 112, and may determine an order of the slave processors that simultaneously access the job queue 111, based on the global lock variable 112.

Figure 2:
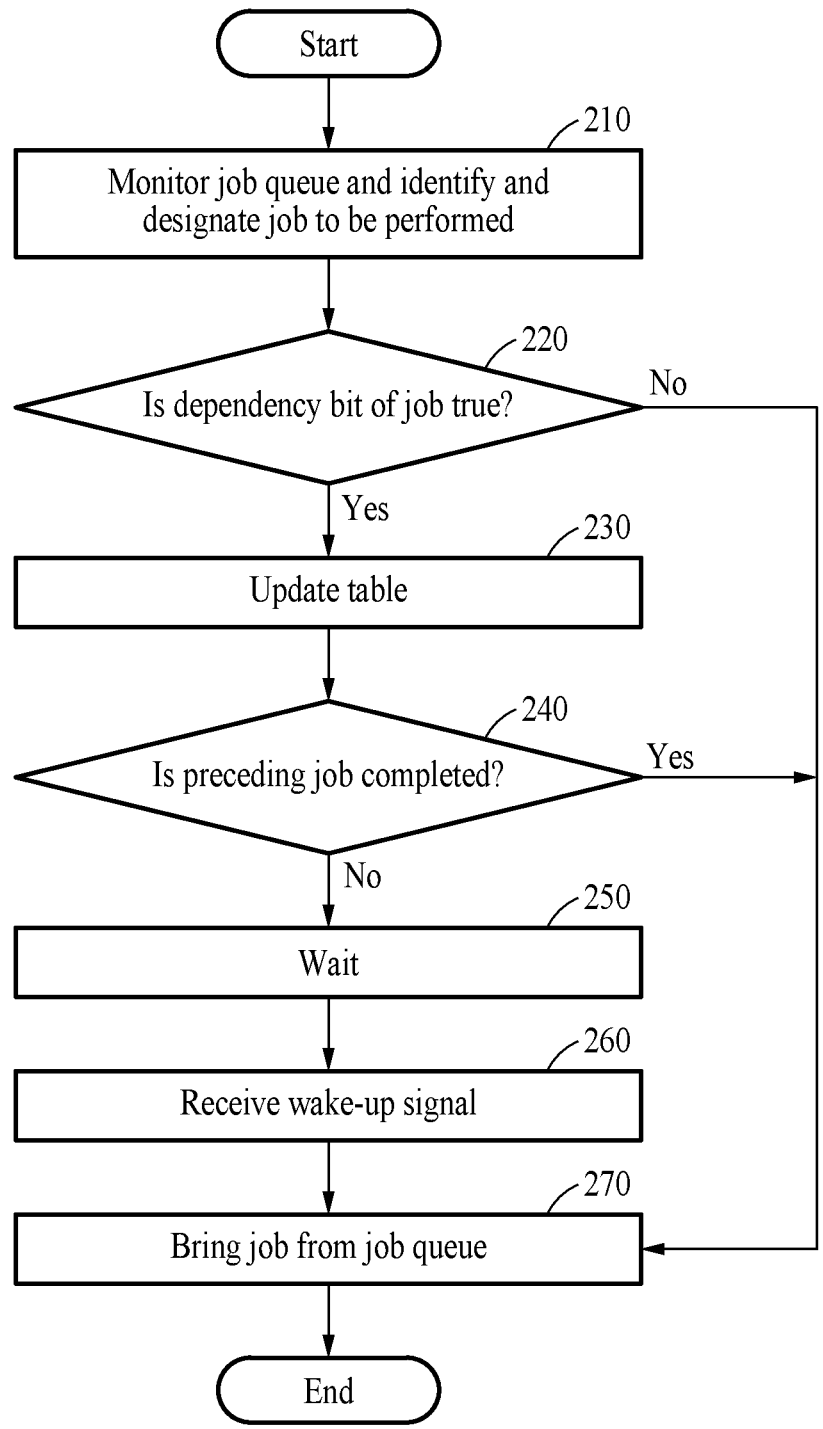
FIG. 2 illustrates an example of active scheduling in a system of multiple processors.

Referring to FIG. 2, in operation 210, an active scheduler may monitor the job queue 111 of the master processor 110, may identify and designate a job that is to be performed by a slave processor including the active scheduler. The "identifying the job" may indicate that the active scheduler determines whether the job queue 111 includes a job.

In operation 220, the active scheduler may determine whether a dependency bit of the designated job is true (or "1"). When the dependency bit of the designated job is true, the active scheduler may update the table 121 in which dependency information of jobs is recorded in operation 230, and may determine whether a preceding job of the designated job is completed in operation 240. When the preceding job of the designated job is not completed, the active scheduler may wait in operation 250. When the preceding job of the designated job is completed, the controller 120 may transmit a wake-up signal to the active scheduler. For example, the active scheduler may receive the wake-up signal from the controller 120 in operation 260, and may bring the designated job from the job queue 111 in operation 270. When the dependency bit of the designated job is false (or "0") in operation 220, the active scheduler may bring the designated job from the job queue 111 in operation 270. When the preceding job of the designated job is determined to be completed in operation 240, the active scheduler may bring the designated job from the job queue 111 in operation 270.

Hereinafter, an individual operation of an active scheduler of each of the slave processors 130-1, 130-2, and 130-*m* will be described.

Figure 3:
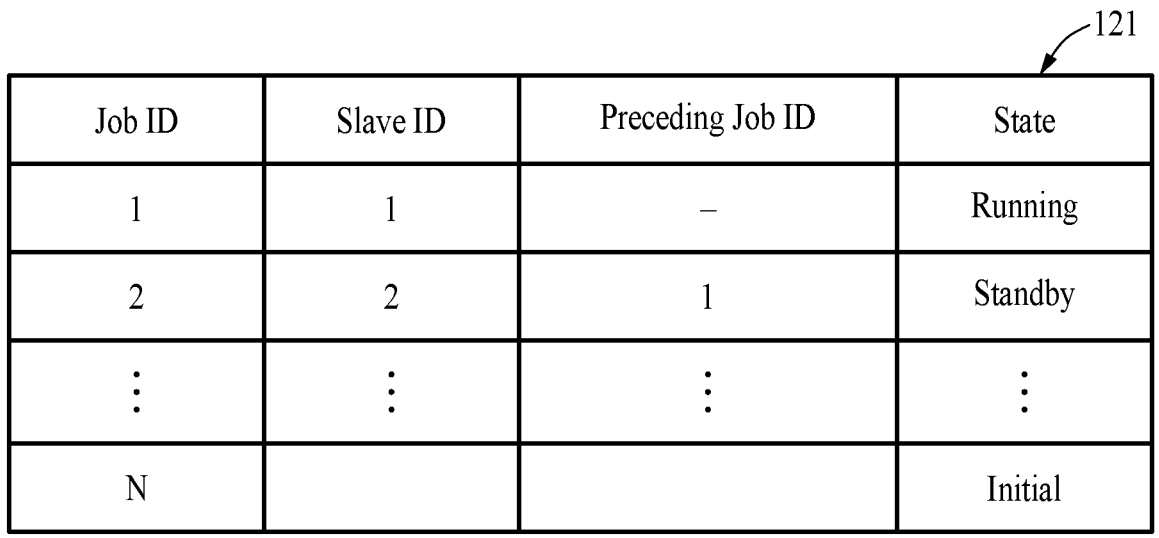
FIG. 3 illustrates an example of active scheduling in a system of multiple processors.

An active scheduler of the slave processor 130-1 may monitor the job queue 111. Since the job queue 111 includes the job #1, the active scheduler of the slave processor 130-1 may designate the job #1. Since a dependency bit of the job #1 is "1", the active scheduler of the slave processor 130-1 may map an ID "1" of the slave processor 130-1 to an ID "1" of the job #1 in the table 121, as shown in FIG. 3. The active scheduler of the slave processor 130-1 may determine that there is no preceding job of the job #1, based on the table 121. In this example, the active scheduler of the slave processor 130-1 may bring the job #1 from the job queue 111. The active scheduler of the slave processor 130-1 may change the state of the job #1 from "initial" to "running" in the table 121.

When the active scheduler brings the job #1 from the job queue 111, the slave processor 130-1 may perform the job #1.

An active scheduler of the slave processor 130-2 may monitor the job queue 111. Since the job queue 111 includes the job #2, the active scheduler of the slave processor 130-2 may designate the job #2. Since a dependency bit of the job #2 is "1", the active scheduler of the slave processor 130-2 may map an ID "2" of the slave processor 130-2 to an ID "2" of the job #2 in the table 121, as shown in FIG. 3. The active scheduler of the slave processor 130-2 may determine that a preceding job of the job #2 is the job #1, based on the table 121. Since the job #1 is in the state of "running", the active scheduler of the slave processor 130-2 may wait. The active scheduler of the slave processor 130-2 may change the state of the job #2 from the state of "initial" to a standby state in the table 121. The active scheduler of the slave processor 130-2 may sleep.

Figure 4:
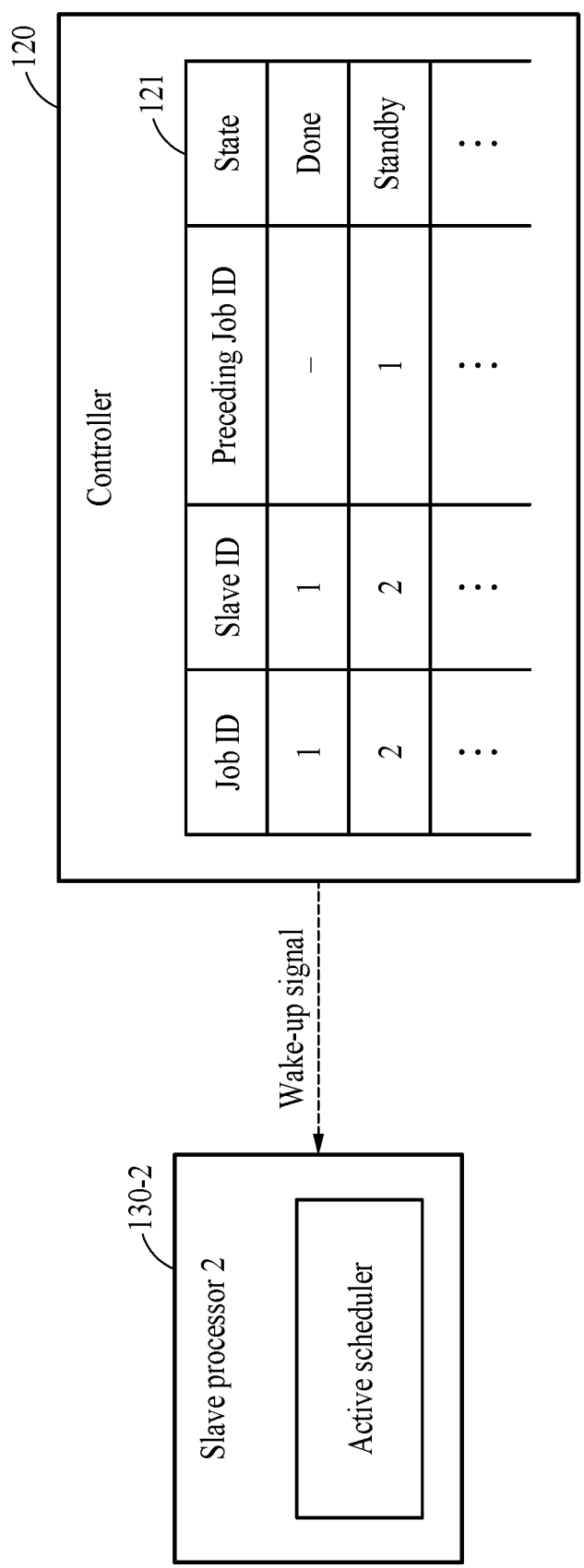
FIG. 4 illustrates an example of active scheduling in a system of multiple processors.

When the slave processor 130-1 completes the job #1, the active scheduler of the slave processor 130-1 may transmit result data of the job #1 to the master processor 110. Also, the active scheduler of the slave processor 130-1 may change the state of the job #1 from "running" to "done" in the table 121, as shown in FIG. 4. In the disclosed examples, the state of "running" indicates a state in which a job is being performed, and the state of "done" indicates a state in which a job is completely performed.

The controller 120 may monitor the table 121 and may determine that the state of the job #1 is changed from "running" to "done". When the state of the job #1 is changed from "running" to "done", the controller 120 may check the state of the job #2, which is the preceding job of the job #1. Since the state of the job #2 is the standby state and the job #2 is mapped to the slave processor 130-2 in the table 121, the controller 120 may transmit a wake-up signal to the active scheduler of the slave processor 130-2. When the wake-up signal is received from the controller 120, the active scheduler of the slave processor 130-2 may wake up the slave processor 130-2. The active scheduler of the slave processor 130-2 may bring the job #2 from the job queue 111. The slave processor 130-2 may perform the job #2. When the slave processor 130-2 completes the job #2, the active scheduler of the slave processor 130-2 may transmit result data of the job #2 to the master processor 110.

An active scheduler of the slave processor 130-m may monitor the job queue 111. Since the job queue 111 includes the job #m, the active scheduler of the slave processor 130-m may designate the job #m. Since a dependency bit of the job #m is "0", the active scheduler of the slave processor 130-m may bring the job #m from the job queue 111. The slave processor 130-m may perform the job #m. When the slave processor 130-m completes the job #m, the active scheduler of the slave processor 130-m may transmit result data of the job #m to the master processor 110.

In an example, a plurality of slave processors may simultaneously access the job queue 111. The master processor 110 may include a global lock variable 112, and may determine an order of the slave processors that simultaneously access the job queue 111, based on the global lock variable 112.

Figure 5:
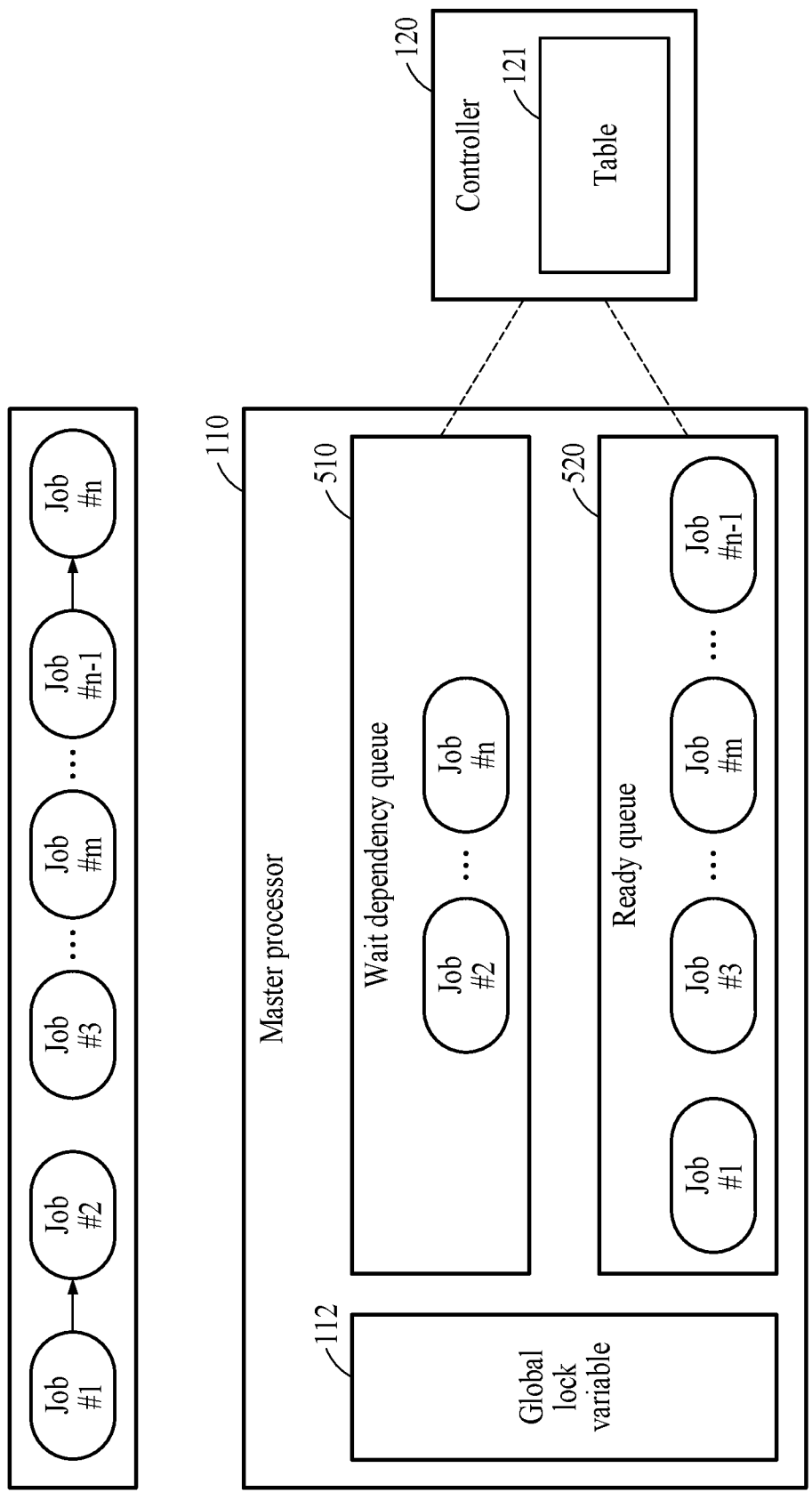
FIG. 5 illustrates an example of active scheduling in a system of multiple processors.

In another example, referring to FIG. 5, the master processor 110 may include a wait dependency queue 510 and a ready queue 520. A job for which a preceding job is present may be enqueued in the wait dependency queue 510, and a job for which a preceding job is absent may be enqueued in the ready queue 520. For example, the master processor 110 may classify jobs of a workload as first jobs for which preceding jobs are present and second jobs for which no preceding job is present, may enqueue the first jobs in the wait dependency queue 510, and may enqueue the second jobs in the ready queue 520.

Each of the slave processors 130-1 to 130-m may access the ready queue 520, may bring a job from the ready queue 520 and may perform the job. When a preceding job of a predetermined job in the wait dependency queue 510 is completed, the master processor 110 may move the predetermined job to the ready queue 520. For example, in FIG. 5, the slave processor 130-1 may complete the job #1 that is the preceding job of job #2, and the active scheduler of the slave processor 130-1 may change the state of the job #1 to "done" in the table 121. The master processor 110 may determine that the job #1 is completed based on the table 121, and may move the job #2 that is to be performed after the job #1 from the wait dependency queue 510 to the ready queue 520.

The above description provided with reference to FIGS. 1 to 4 is also applicable to the example of FIG. 5, and accordingly further description is not repeated herein.

Figure 6:
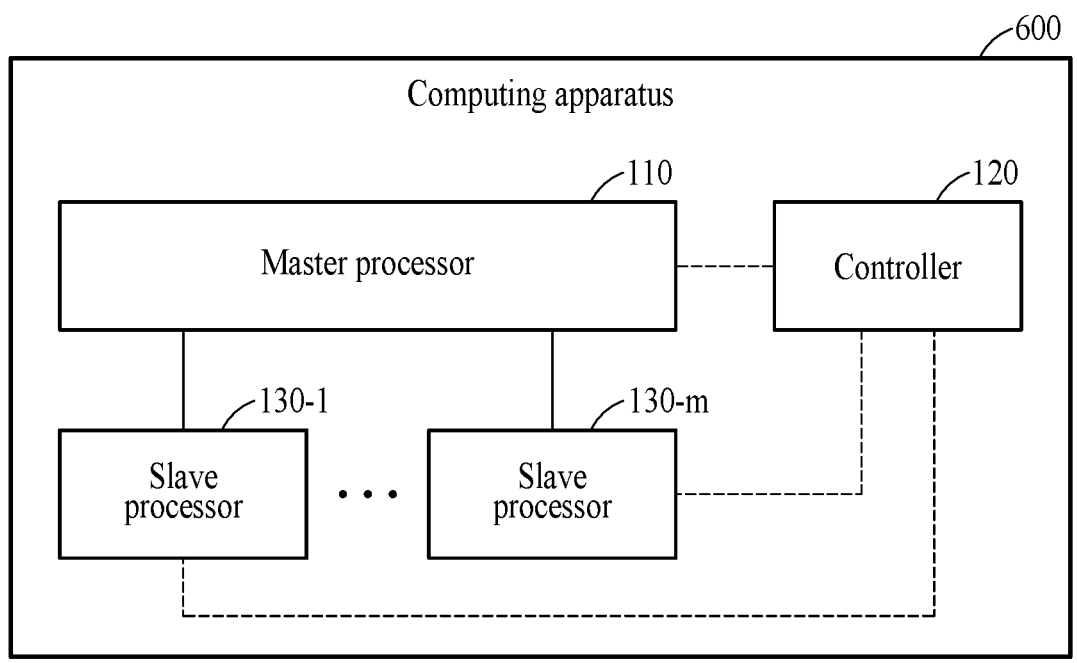
FIG. 6 illustrates an example of a computing apparatus.

FIG. 6 illustrates an example of a computing apparatus 600.

Referring to FIG. 6, the computing apparatus 600 may include a master processor 110, a controller 120, and slave processors 130-1 to 130-m.

The computing apparatus 600 may be referred to as a "computing system".

The master processor 110 may enqueue jobs of a workload in a job queue 111. The job queue 111 may include a bit indicating whether each of the jobs has a dependency.

A first slave processor among the slave processors 130-1 to 130-m may determine whether a job to be brought from the job queue 111 of the master processor 110 or a designated job has a dependency. In an example, when a bit indicating whether the job to be brought has a dependency is "true", the first slave processor may determine that the job has the dependency. In another example, when the bit is "false", the first slave processor may determine that the job does not have a dependency.

When the job to be brought has a dependency, the first slave processor may update a state of the job to be brought to a table 121 in which information of each of a plurality of jobs is recorded. When the job to be brought has a dependency, the first slave processor may map an ID of the first slave processor to an ID of the job to be brought in the table 121. Also, the first slave processor may change the state of the job to be brought to a standby state in which a job may be performed.

When a preceding job of the job to be brought is in the state of "done", the first slave processor may bring the job from the job queue 111 and may perform the job.

When the preceding job is in the state of "running", the first slave processor may wait. In this example, the first slave processor may sleep. The first slave processor may receive, from the controller 120, a signal (for example, the above-described wake-up signal) that is based on a change in the state of the preceding job of the job to be brought from "running" to "done". When the signal is received from the controller 120, the first slave processor may wake up, may bring a job from the job queue 111, and may perform the job.

The computing apparatus 600 is not limited to the example of FIG. 6, and may correspond to a heterogeneous and/or homogeneous system with processing units or a system with a hierarchical structure. The processing units may include, for example, central processing units (CPUs), graphics processing units (GPUs), or neural processing units (NPUs). In the heterogeneous and/or homogeneous system or the system with the hierarchical structure, an upper-level processor may perform an operation of the master processor 110, and each of lower-level processors (for example, slave processors 130-1 to 130-m) may include an active scheduler.

The above description provided with reference to FIGS. 1 to 5 is also applicable to the example of FIG. 6, and accordingly further description is not repeated herein.

Figure 7:
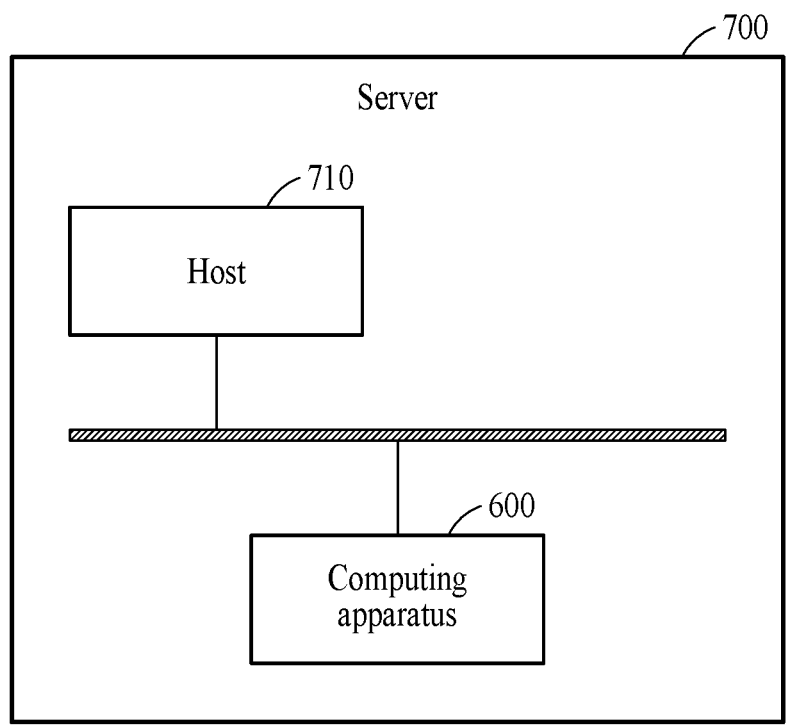
FIG. 7 illustrates an example of a server.

FIG. 7 illustrates an example of a server 700.

Referring to FIG. 7, the server 700 may include a host 710 and a computing apparatus 600.

The host 710 may transmit a workload to the computing apparatus 600. The workload may represent an instruction to execute a neural network for object recognition, speech recognition, pattern recognition, computer vision, or machine translation, for example. The workload may include a workload with coarse-grained parallelism, as described above.

The computing apparatus 600 may correspond to the computing apparatus 600 described in FIG. 6. A master processor 110 included in the computing apparatus 600 may enqueue jobs of the workload in a job queue 111, and each of slave processors 130-1 to 130-*m* may bring a job from the job queue 111 and perform the job. Each of the slave processors 130-1 to 130-*m*, instead of the master processor 110, may mainly perform scheduling. The master processor 110 may not have a scheduling load or scheduling burden. The slave processors 130-1 to 130-*m* may share a scheduling load of the master processor 110, and thus it is possible to enhance overall performance of the computing apparatus 600. Also, a number of idle slave processors may be minimized until the computing apparatus 600 completes the workload, and thus an overall latency may be reduced.

In another example, the computing apparatus 600 may be included in a user terminal. The user terminal may include, for example, a smartphone, a tablet, or a notebook computer, but is not limited thereto.

The above description provided with reference to FIGS. 1 to 6 is also applicable to the example of FIG. 7, and accordingly further description is not repeated herein.

The apparatuses, units, modules, devices, and other components described herein with respect to FIGS. 1 and 4-7, such as master processor 110, controller 120, slave processors 130-1 to 130-*m*, computing apparatus 600, server 700, and host 710, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing software, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An active scheduling method performed with a master processor and a plurality of slave processors, the active scheduling method comprising:
    determining whether a job to be performed has a dependency by referencing a job queue;
    in a case in which it is determined that the job to be performed has a dependency, updating a state of the job to be performed in a table in which information of each of a plurality of jobs is recorded;
    analyzing a state of a job preceding the job to be performed based on the table; and
    in a case in which the job preceding the job to be performed is determined to have been completed, performing the job to be performed by retrieving the job to be performed from the job queue, wherein
    the job queue is included in the master processor and at least one slave processor, from among the plurality of slave processors, is configured to perform the determining, updating, analyzing, and performing.

2. The active scheduling method of claim 1, further comprising:
    in a case in which the job preceding the job to be performed is determined to be running, waiting until the job preceding the job to be performed is completed; and
    in response to receiving a signal indicating the job preceding the job to be performed has been completed, performing, by the at least one slave processor, the job to be performed.

3. The active scheduling method of claim 2, further comprising:
    waking up the at least one slave processor in response to the signal being received by the at least one slave processor,
    wherein the at least one slave processor is sleeping during the waiting.

4. The active scheduling method of claim 2, wherein the table is stored in a controller, and the controller is configured to transmit the signal indicating the job preceding the job to be performed has been completed.

5. The active scheduling method of claim 4, wherein the controller is configured to determine that the job to be performed is mapped to the at least one slave processor based on the table and to transmit the signal to the at least one slave processor, in response to the state of the job preceding the job to be performed being changed to indicate the job preceding the job to be performed has been completed.

6. The active scheduling method of claim 1, wherein updating the state of the job to be performed comprises mapping an identifier (ID) of one of the slave processors to an ID of the job to be performed recorded in the table, and changing the state of the job to be performed to a standby state.

7. The active scheduling method of claim 1, further comprising:
    in a case in which it is determined that the job to be performed does not have a dependency, performing the job to be performed by retrieving the job to be performed from the job queue.

8. The active scheduling method of claim 1, wherein
    the job queue comprises a bit indicating whether the job to be performed has the dependency, and
    determining whether the job to be performed has the dependency comprises determining that the job to be performed has the dependency in response to the bit being true, and determining that the job to be performed does not have the dependency in response to the bit being false.

9. The active scheduling method of claim 1, further comprising:
    transmitting result data generated by completely performing the job to be performed to the master processor.

10. The active scheduling method of claim 1, wherein a plurality of jobs, which include the job to be performed, are enqueued in the job queue by the master processor.

11. The active scheduling method of claim 10, wherein a workload corresponding to the plurality of jobs comprises a workload with coarse-grained parallelism.

12. A computing apparatus comprising:
    a master processor comprising a job queue and configured to enqueue a plurality of jobs of a workload in the job queue; and
    slave processors,
    wherein a first slave processor, among the slave processors, is configured to:
        determine whether a job to be performed from the job queue has a dependency,
        in a case in which it is determined that the job to be performed has a dependency, update a state of the job to be performed in a table in which information of each of the plurality of jobs is recorded, analyze a state of a job preceding the job to be performed based on the table, and in a case in which the job preceding the job to be performed is determined to have been completed, perform the job to be performed by retrieving the job to be performed from the job queue.

13. The computing apparatus of claim 12, wherein the first slave processor is configured to wait, in a case in which the job preceding the job to be performed is determined to be running, and, in response to receiving a signal indicating the job preceding the job to be performed has been completed, to perform the job to be performed.

14. The computing apparatus of claim 13, wherein the first slave processor is configured to sleep during the waiting and to wake up in response to receiving the signal.

15. The computing apparatus of claim 14, further comprising a controller configured to store the table and to transmit the signal indicating the job preceding the job to be performed has been completed to the first slave processor.

16. The computing apparatus of claim 15, wherein the controller is configured to determine that the job to be performed is mapped to the first slave processor based on the table and to transmit the signal to the first slave processor, in response to the state of the job preceding the job to be performed being changed to indicate the job preceding the job to be performed has been completed in the table.

17. The computing apparatus of claim 12, wherein the first slave processor is configured to map an identifier (ID) of the first slave processor to an ID of the job to be performed recorded in the table, and to change the state of the job to be performed to a standby state.

18. The computing apparatus of claim 12, wherein the job queue comprises a bit indicating whether the job to be performed has the dependency, and the first slave processor is configured to determine that the job to be performed has the dependency in response to the bit being true, and to determine that the job to be performed does not have the dependency in response to the bit being false.

19. The computing apparatus of claim 12, wherein the workload comprises a workload with coarse-grained parallelism.

20. The computing apparatus of claim 12, wherein the master processor is configured to determine an order of the slave processors in response to the slave processors simultaneously accessing the job queue.

21. A computing apparatus comprising:

a master processor comprising a first queue and a second queue and configured to analyze a dependency of each of a plurality of jobs of a workload, to classify the jobs as first jobs for which a preceding job is present and second jobs for which a preceding job is absent, to enqueue the first jobs in the first queue, and to enqueue the second jobs in the second queue; and a plurality of slave processors, wherein each of the slave processors is configured to retrieve one of the second jobs from the second queue by accessing the second queue and to perform the retrieved second job.

22. The computing apparatus of claim 21, wherein the master processor is configured to move one first job among the first jobs to the second queue in response to a job preceding the one first job being completely performed.

* * * * *